(12) United States Patent
McCune et al.

(10) Patent No.: US 9,274,876 B2
(45) Date of Patent: *Mar. 1, 2016

(54) DIAGNOSTIC DATA SET COMPONENT

(71) Applicant: INTERNATIONAL BUSINESS MACHINES CORPORATION, Armonk, NY (US)

(72) Inventors: Franklin E. McCune, Tucson, AZ (US); David C. Reed, Tucson, AZ (US); Michael R. Scott, Honolulu, HI (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,087

(22) Filed: Jun. 17, 2014

(65) Prior Publication Data

US 2014/0298102 A1 Oct. 2, 2014

Related U.S. Application Data

(63) Continuation of application No. 13/870,225, filed on Apr. 25, 2013, now Pat. No. 8,775,872, which is a continuation of application No. 12/683,748, filed on Jan. 7, 2010, now Pat. No. 8,458,519.

(51) Int. Cl.
*G06F 11/07* (2006.01)

(52) U.S. Cl.
CPC .......... *G06F 11/079* (2013.01); *G06F 11/0775* (2013.01)

(58) Field of Classification Search
CPC .......... G06F 17/30067; G06F 11/0775; G06F 17/30286; G06F 21/6218; G06F 11/079; G06F 17/30011; G06F 17/30312
USPC ................................. 714/25, 16, 37
See application file for complete search history.

(56) References Cited

U.S. PATENT DOCUMENTS

| | | |
|---|---|---|
| 5,121,483 A | 6/1992 | Monahan et al. |
| 5,644,696 A | 7/1997 | Pearson et al. |
| 5,892,898 A * | 4/1999 | Fujii et al. ........... 714/57 |
| 6,029,205 A | 2/2000 | Alferness et al. |
| 6,313,768 B1 | 11/2001 | Allen |
| 6,571,323 B2 | 5/2003 | Lai et al. |
| 6,662,265 B1 | 12/2003 | Kessler et al. |
| 7,146,544 B2 * | 12/2006 | Hsu et al. ........... 714/57 |
| 7,617,074 B2 | 11/2009 | Beish et al. |
| 7,681,079 B2 | 3/2010 | Xu et al. |
| 7,689,882 B2 | 3/2010 | Nakamura |

(Continued)

*Primary Examiner* — Loan L. T. Truong
(74) *Attorney, Agent, or Firm* — Griffiths & Seaton PLLC

(57) ABSTRACT

Various embodiments for retaining diagnostic information for data in a computing storage environment. In one such embodiment, a diagnostic component, apart from a volume table of contents (VTOC), associated with an integrated catalog facility (ICF) catalog and with a base data set from data sets via a catalog association record, is initialized. The diagnostic component is configured to retain base data set-specific diagnostic information retrievable by the computing storage environment to assist in error diagnosis and the ICF catalog is one of the data sets storing information about the data sets for facilitating a retrieval of a name of the base data set and assists with retaining and retrieval of the base data set-specific diagnostic information. The base data set-specific diagnostic information is stored pursuant to at least one event associated with the base data set.

23 Claims, 3 Drawing Sheets

(56) References Cited

U.S. PATENT DOCUMENTS

| | | |
|---|---|---|
| 7,904,756 B2 | 3/2011 | Dilman et al. |
| 7,930,215 B2 | 4/2011 | Pombo et al. |
| 7,996,381 B2 | 8/2011 | Uber, III et al. |
| 8,014,025 B2 | 9/2011 | Steele et al. |
| 8,140,479 B2 | 3/2012 | Barlen et al. |
| 8,140,886 B2 * | 3/2012 | Lehr ............... G06F 17/30067 714/15 |
| 8,458,519 B2 * | 6/2013 | McCune ............ G06F 11/0775 707/674 |
| 8,522,209 B2 | 8/2013 | Wintergerst et al. |
| 2002/0023070 A1 | 2/2002 | Branch et al. |
| 2002/0129335 A1 | 9/2002 | Lewis |
| 2002/0169637 A1 | 11/2002 | Akers et al. |
| 2005/0076265 A1* | 4/2005 | Hsu et al. ................. 714/27 |
| 2005/0114381 A1 | 5/2005 | Borthakur et al. |
| 2005/0228880 A1* | 10/2005 | Champlin .................. 709/224 |
| 2006/0242431 A1* | 10/2006 | LeCrone et al. ............ 713/193 |
| 2007/0006165 A1 | 1/2007 | Lam et al. |
| 2007/0016893 A1 | 1/2007 | Branda et al. |
| 2007/0050269 A1* | 3/2007 | Choi et al. .................. 705/27 |
| 2007/0061631 A1 | 3/2007 | Nakamura |
| 2007/0074170 A1 | 3/2007 | Rossmann |
| 2007/0088769 A1* | 4/2007 | Pace et al. .................. 707/204 |
| 2007/0198550 A1 | 8/2007 | Irving et al. |
| 2008/0010370 A1 | 1/2008 | Peake et al. |
| 2008/0065706 A1* | 3/2008 | Miller et al. ................ 707/205 |
| 2008/0077988 A1 | 3/2008 | Small |
| 2008/0109599 A1* | 5/2008 | Smith ............... G06F 17/30067 711/112 |
| 2008/0157980 A1 | 7/2008 | Sachanandani et al. |
| 2008/0162183 A1 | 7/2008 | Sachanandani et al. |
| 2008/0172263 A1 | 7/2008 | Heyman |
| 2008/0209267 A1 | 8/2008 | Xu et al. |
| 2008/0209404 A1 | 8/2008 | Brady |
| 2008/0243968 A1 | 10/2008 | Schmelter et al. |
| 2008/0243969 A1 | 10/2008 | Wintergerst et al. |
| 2008/0262638 A1 | 10/2008 | Haggar et al. |
| 2008/0307267 A1 | 12/2008 | Chandrasekaran |
| 2009/0106601 A1* | 4/2009 | Ngai et al. .................. 714/39 |
| 2009/0106603 A1 | 4/2009 | Dilman et al. |
| 2009/0193062 A1* | 7/2009 | Chauvet ............ G06F 11/1469 |
| 2009/0281983 A1 | 11/2009 | Cowden et al. |
| 2009/0327854 A1 | 12/2009 | Chhajer et al. |
| 2010/0094811 A1* | 4/2010 | Lehr et al. ................... 707/674 |
| 2010/0094832 A1* | 4/2010 | Scott ..................... G06F 9/52 707/705 |
| 2010/0185697 A1* | 7/2010 | Lehr ............... G06F 17/30312 707/803 |
| 2010/0205159 A1 | 8/2010 | Li et al. |
| 2011/0167302 A1 | 7/2011 | McCune et al. |
| 2013/0091570 A1 | 4/2013 | McCorkendale et al. |

\* cited by examiner

DIAGNOSTIC DATA SET COMPONENT

CROSS-REFERENCE TO RELATED APPLICATIONS

This application is a Continuation of U.S. patent application Ser. No. 13/870,225, filed on Apr. 25, 2013, the contents of which are incorporated herein by reference.

BACKGROUND OF THE INVENTION

1. Field of the Invention

The present invention relates in general to computers, and more particularly to a method, system, and computer program product for retaining base data set-specific diagnostic information for troubleshooting in a computing environment.

2. Description of the Related Art

The majority of businesses in the world today use computers and computer operating systems to store and manage information. The information stored in computer operating systems is typically organized into catalogs. Users may want to pass information from one catalog to another for several reasons. For example, the user might want to assign each division within a company its own catalog. Thus, the company would need to pass information associated with the division that is stored in the company catalog into a corresponding division catalog.

Catalogs are utilized to organize and locate data sets. A catalog in essence is a data set that contains information required to locate other data sets. A data set is often the fundamental unit of data storage and retrieval and typically consists of a collection of data in one of several prescribed arrangements. These arrangements are described by control information to which the computer operating system has access. A data set is a collection of logically related data records stored on a single external storage volume, or a set of volumes. A data set can be, for example, a source program, a library of macros, or a file of data records used by a processing program. A catalog does not have to be on the same volume(s) as the data sets the catalog describes. A catalog can refer to hundreds or thousands of data sets spread across many volumes.

Catalogs are sometimes structured in an integrated catalog facility (ICF). An ICF catalog may include two components. One component contains non-data-specific information, or the logical description, of a data set. The other component contains data-specific information, or the physical description, of a data set. Catalogs allow users to find and access a data set by name without knowing the exact location of the data set in memory storage. By cataloging data sets, users do not need to know about the storage setup.

Currently, when a user receives an error for a specific data set, the user must gather information from numerous sources in an attempt to pinpoint the root cause of the error. For example, the user may have to examine system logs, logrec error logs, joblogs, system management facility (SMF) records, and a variety of additional shared repositories for information related to this specific data set. The process of sorting through potentially numerous amounts of data to find small portions relating to the specific data set may expend resources, such as time and bandwidth.

SUMMARY OF THE INVENTION

In light of the foregoing, a need exists for a mechanism alleviating the drawbacks described previously, whereby a user can find useful information relating to a specific data set without having to search through a variety of sources and through potentially a large amount of data.

Accordingly, various embodiments for retaining diagnostic information for data in a computing storage environment are provided. In one such embodiment, by way of example only, a method for retaining diagnostic information for data in a computing storage environment is provided. A diagnostic component, apart from a volume table of contents (VTOC), associated with an integrated catalog facility (ICF) catalog and with a base data set from data sets via a catalog association record is initialized. The diagnostic component configured to retain base data set-specific diagnostic information retrievable by the computing storage environment to assist in error diagnosis and the ICF catalog is one of the data sets storing information about the data sets for facilitating a retrieval of a name of the base data set and assists with retaining and retrieval of the base data set-specific diagnostic information. The base data set-specific diagnostic information is stored pursuant to at least one event associated with the base data set.

Additional system and computer program product embodiments are provided and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for retaining diagnostic information for data in a computing storage environment. These embodiments leverage what is referred to herein as a diagnostic data set component, a data structure that is associated with a specific data set. In one embodiment, the diagnostic data set component may be considered an appendage to a specific data set. The diagnostic data set component may be adapted to retain diagnostic information relating to the specific, base data set to which it is associated. In one embodiment, the component may retain critical diagnostic information.

The diagnostic data set component, in one embodiment, may be associated with the base data set via a catalog entry that logs the association and is used to direct the diagnostic information to the correct location. When a problem arises with the base data set, the information in the diagnostic component may then be retrieved for the specific data set. In other words, the diagnostic component retains data set-specific diagnostic information.

Figure 1:
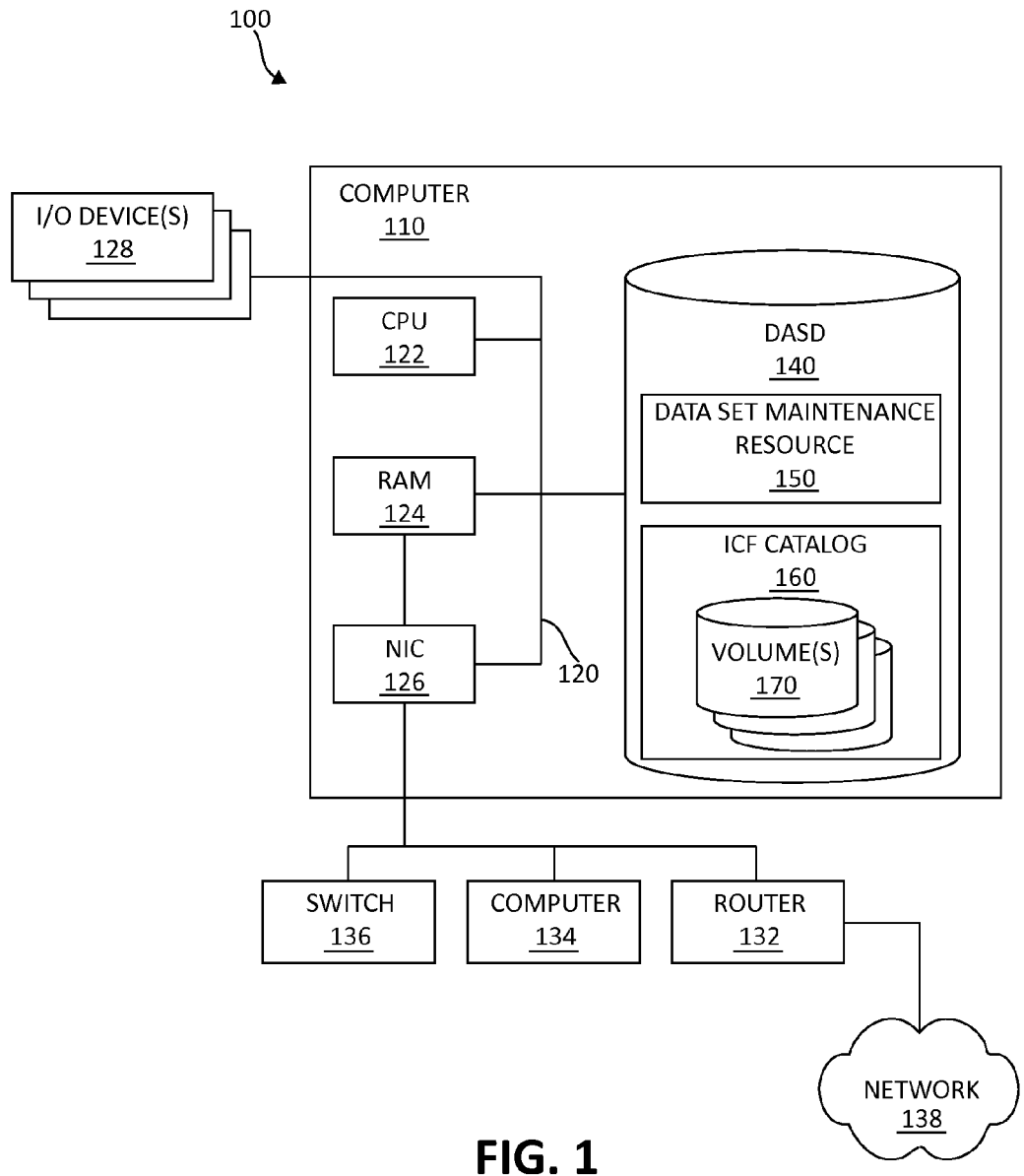
FIG. 1 is an exemplary computing environment.

FIG. 1 depicts one embodiment of a computer system for retaining data-set specific diagnostic information in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set recovery resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set recovery resource 150. In the depicted embodiment, the data set recovery resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
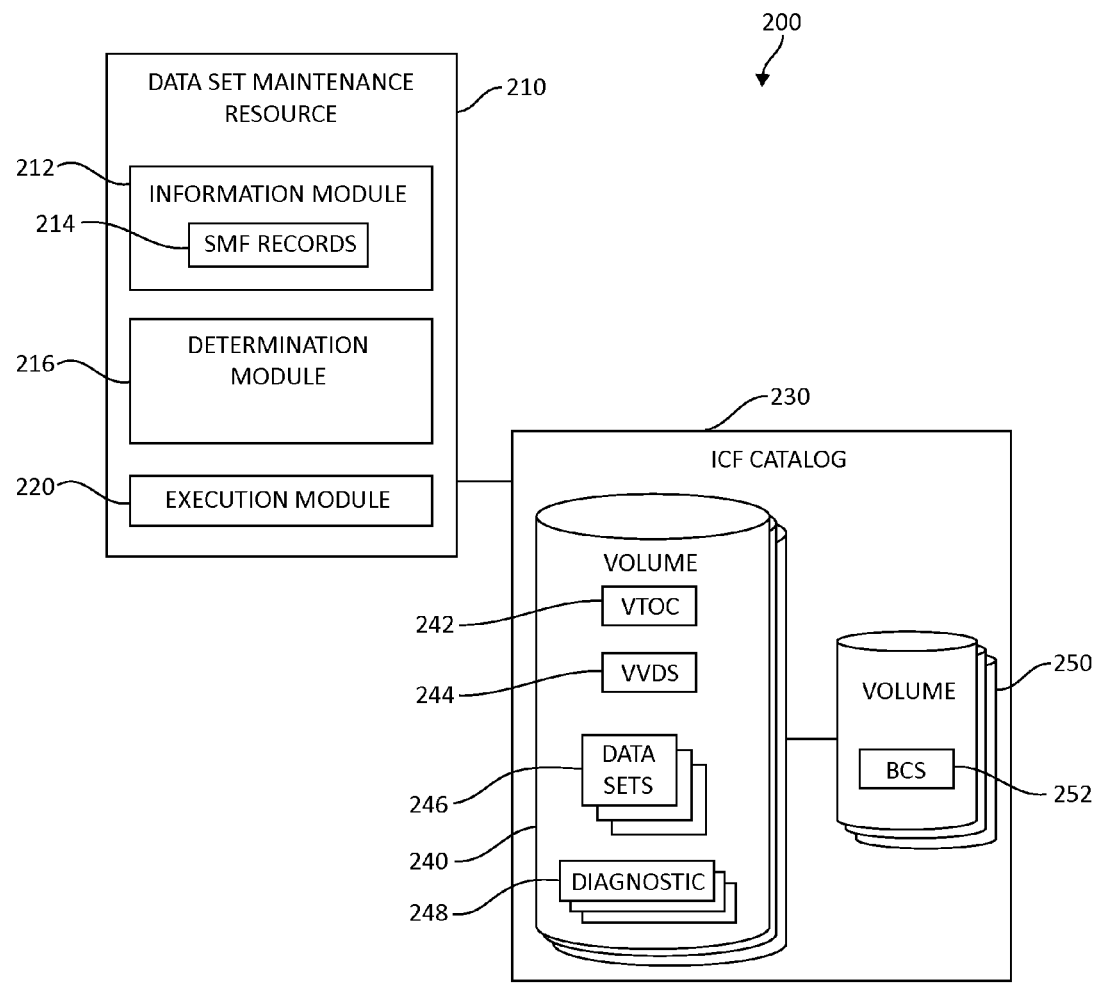
FIG. 2 is an exemplary data set maintenance resource.

FIG. 2 depicts one embodiment of a DASD environment comprising a data set maintenance resource and an integrated catalog facility (ICF) catalog in accordance with the present invention. The DASD environment 200 includes a data set maintenance resource 210, an information module 212, system management facility (SMF) records 214, a determination module 216, and an execution module 220. ICF catalog 230 includes a volume 240, a volume table of contents (VTOC) 242, a VSAM volume data set (VVDS) 244, data sets 246, diagnostic data set components 248 associated with the data sets 246, a volume 250, and a basic catalog structure (BCS) 252.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may be used by the data set maintenance resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents. The relationship between the BCS 252, VVDS 244, and VTOC 242 is not exclusive.

In the depicted embodiment, the data set maintenance resource 210 includes the information module 212, the determination module 216, and the execution module 220. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed. Other information retrieved by the information module may include a data set name, catalog status, the type entry in the catalog such as the type of data set or the VSAM index of a VSAM data set, or associated data set names if applicable. The information module 212 includes SMF records 214 in a data repository for tracking such actions as opening a file, closing a file, and catalog updates of VSAM data sets. Other information retrieved by the information module may include a data set name, catalog status, the type entry in the catalog such as the type of data set or the VSAM index of a VSAM data set, or associated data set names if applicable. The information retrieved may further include identification of data sets to bypass during the recovery.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In accordance with the present invention, information module 212 may be configured to retain and/or retrieve diagnostic information in diagnostic components 248 as will be further described in detail. Diagnostic components 248 contain data set-specific diagnostic information for indexed and non-indexed data sets alike, such as VVDS 244 and data sets 246.

In the depicted embodiment, the determination module 214 determines one or more recovery operations to perform. The determination module 214 may examine VTOC and/or VVDS information, including data set-specific diagnostic information to determine one or more operations to perform, such as operations pursuant to troubleshooting an error as one of ordinary skill will appreciate. The determination module 214 may use the diagnostic information obtained from the information module 212 for further determination in the data set maintenance resource 210.

The execution module 220 executes the one or more generated control statements to perform various operations on the data sets 246, such as storing, retaining, and retrieving data set-specific diagnostic information contained in the diagnostic components 248. In one embodiment, the execution module 220 selects a utility or a preexisting recovery application to execute the generated control statement with. Selecting a utility may be based on the type of data set to be processed. In another embodiment, selecting a utility is based on the syntax of the control statement.

One utility that may be used by the execution module 220 is IDCAMS. IDCAMS is a utility used to create, delete, rename, catalog, or uncatalog data sets. IDCAMS may also be used to manage catalogs. Another utility that may be used by the execution module 220 is IEHPROGM. IEHPROGM is a utility that provides facilities for deleting or renaming data sets and for cataloging or uncataloging non-VSAM data sets. Still another utility that may be used by the execution module 220 is VSAM Examine. VSAM Examine is a verification tool for VSAM data sets.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set recovery resource 210 reside on the DASD 140. The data set maintenance resource 210 may act on the ICF catalog 230 and its components to perform operations relating to the retention and retrieval of data set-specific diagnostic information.

The data set maintenance resource 210 utilizes the VTOC 242 to obtain information about volume 240 and data sets 246. The VTOC 242 may store certain information regarding data sets such as data set attributes and a description, which may include size, location, and extent information. The VVDS 244 may also be used by the data set recovery resource 210 to obtain information regarding data sets 246.

Figure 3:
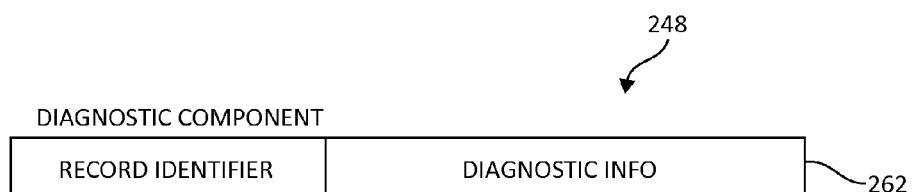
FIG. 3 is an block diagram of an exemplary data structure.

In view of FIG. 2, and turning now to FIG. 3, a block diagram of an exemplary diagnostic component 248 is shown. Diagnostic component 248 includes a record identifier portion 260, followed by a diagnostic information portion 262. Record identifier 260 is used by various components in the data set maintenance resource 210 to identify a particular diagnostic component 248. For example, the record identifier 260 allows for, when the diagnostic information is read by the data set maintenance resource 210, the ability for the resource 210 to read back record by record such that the resource 210 is aware of what type of diagnostic data the records are for.

Diagnostic information 262 contains data set-specific diagnostic information for a base data set as will be further described.

Diagnostic component 248 may, in one embodiment, be associated with a base data set via a catalog association record maintained by the data set maintenance resource 210. The catalog association record may be, in one embodiment, maintained in the BCS entries 252, the VTOC entries 242, or elsewhere in the ICF catalog 230. When the base data set is updated, the associated diagnostic component 248 may also be updated when certain events take place. This diagnostic component 248 may be created pursuant to a variety of circumstances. For example, the diagnostic component 248 may be created when the data set is first created during the initial define, or the diagnostic component 248 may be added later to a pre-existing data set.

The diagnostic component 248 may be configured such that, in one embodiment, when a listcat (list catalog) operation of the base data set is performed, the operation will also show the associated diagnostic component 248 for the data set. The diagnostic component 248 may be incorporated to a variety of functions carried out by the data set maintenance resource 210, such as during data set backup and recovery processing, or data set move operations.

When a data set becomes damaged, several pieces of information may be used to piece together events that caused the damage. These events may be added to the diagnostic component 248. In one embodiment, the diagnostic component 248 is generally smaller than the actual data set, and due to space constraints contains the most recent diagnostic information retained for the data set.

A variety of diagnostic information may be included in the diagnostic component 248, as one of ordinary skill in the art will appreciate. The following are examples of such information. First, a number of times (e.g., last 10 times) the data set was opened for output may be tracked. Various events, such as a particular job, system, time of open, time of close, and, when available, the high used relative byte address at the time of closure, may be logged. These activities may be performed such that when the SMF records are cut for a specific file, an extension to the SMF processing for open and close activity updates the diagnostic component 248.

In a second example, the last backup data set may be tracked, including the name of the backup, location, and date of the backup. These tracking operations may be performed by using existing backup products such as hierarchical storage management (HSM) update the diagnostic component 248 for those data sets which have such at the time of backup. In a third example, each system that accessed the data set may be recorded. In many cases, serialization issues exist between systems as one of ordinary skill in the art will appreciate, and clients may not be aware that another system is accessing a particular file. This information may be, in one embodiment, tracked during the SMF processing at open time.

In a fourth example, prior events related to the data set may be kept. These events may include error message that had previously been issued against a particular base data set. This process may be accomplished through several different mechanisms, such as including monitoring syslogs and monitoring data set level errors, and updating those data sets that have the diagnostic component defined. Another method may include those programs issuing data set level error messages to indicate in the error event that this type of event should be logged for those data sets with a diagnostic component. At this time of the error, a catalog locate may be used to determine if the diagnostic component existed at that time.

A fifth example relates to the failure of address spaces. Typically, when an address space fails, enqueues (ENQs) for data sets are cleaned up. For those data sets with an diagnostic component, such a clean up event would be tracked. For example, the ENQ type and owner may be logged along with a timestamp to show that the data set was open at the time of an address space crash. When the ENQs are being removed, the catalog information may then be checked to see if the diagnostic component exists, and the information would then be recorded accordingly.

Finally, other usable, tunable options could also be added. These could include things like extent information, and when the extent was moved or processed by space management products including any differences resulting from such movement or processing. In addition, the diagnostic information may also include when changes to the extent allocation is made, such as partial release or extent consolidation, again as one of ordinary skill in the art will appreciate.

Figure 4:
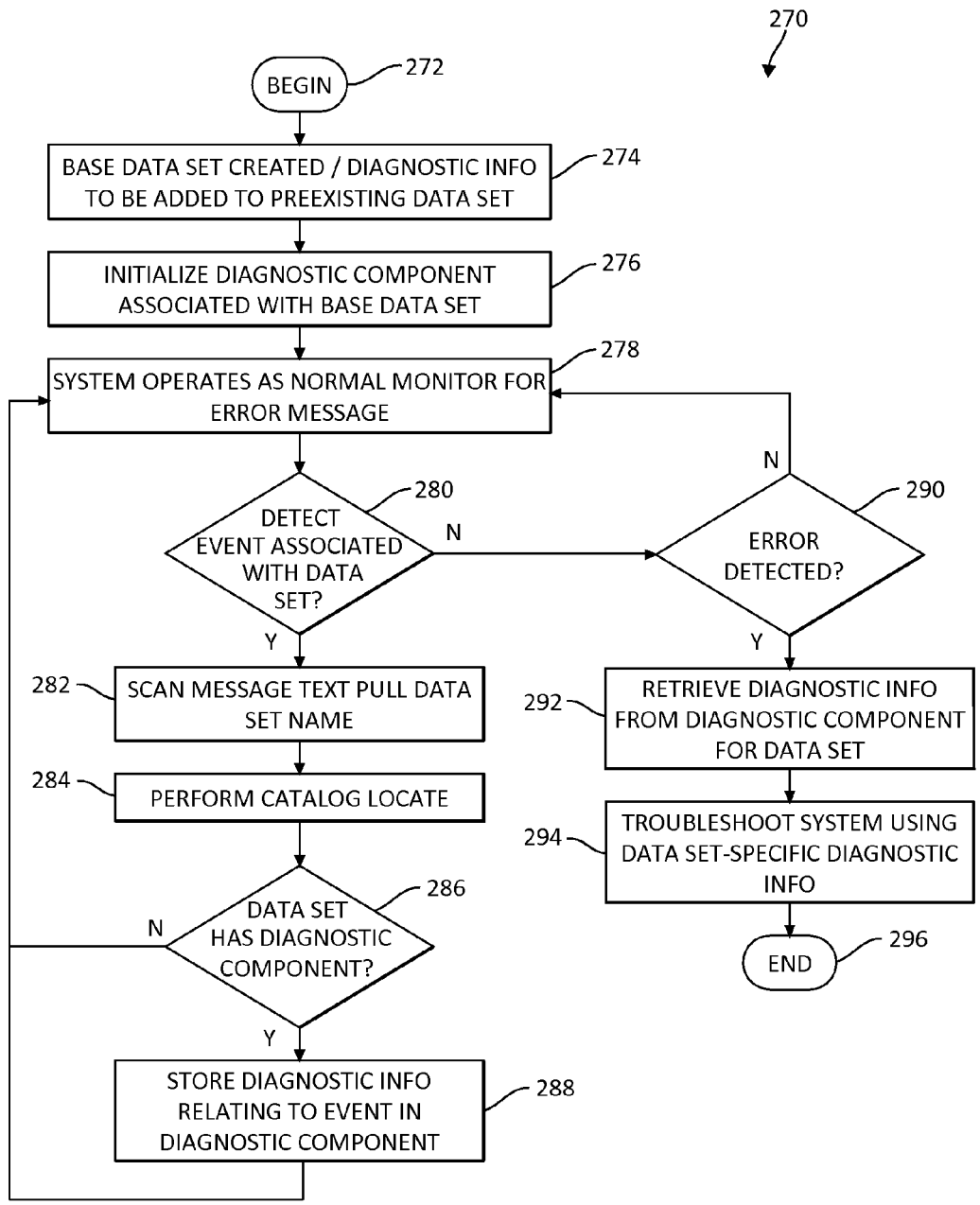
FIG. 4 is a flow chart diagram of an exemplary method for retaining diagnostic information for data in a computing storage environment.

Turning now to FIG. 4, a logic flow diagram of an exemplary method 270 for retaining data set-specific diagnostic information in a computing storage environment is depicted. As one skilled in the art will appreciate, the described method may be implemented by various means, such as hardware, software, firmware, or a combination thereof operational on or otherwise associated with the computing storage environment. For example, the method 270 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. The method 270 may be carried out by various components of the data set maintenance resource 210 (FIG. 2), as previously described, such as by various data set modules.

Method 270 begins (step 272) with a circumstance causing the diagnostic component to be associated with a particular base data set (step 274). As previously described, this association may be made pursuant to creation of the base data set, or the diagnostic component may be added to a preexisting data set. At this time, the diagnostic component is initialized and associated with the data set, for example, via a catalog association record (step 276). The system then operates as normal, and, for example, monitors for error messages, etc. (step 278).

At some point, an event is detected that is associated with a particular data set (step 280). A variety of events may be detected as previously described, such as when a data set is opened, or a backup operation for the data set occurs. Once this occurs, the system may scan message text to pull a particular data set name (step 282). The system may then perform a catalog locate operation (step 284). If, pursuant to the catalog locate, it is determined that the data set has an accompanying diagnostic component (step 286), then the system stores the diagnostic information relating to the event in the diagnostic component (step 288). For example and as previously described, this process may include storing diagnostic information relating to events such as logging a job, system, time of open, time of close, or a system that accessed the data set.

Once the diagnostic information is stored, or the system determines that a diagnostic component is not associated with a particular data set, the system returns to step 278 to continue operation as normal. If, at a later time, an error/error message is detected (step 290), the system may retrieve the diagnostic information from a particular base data set determined to have caused the error (step 292). This may be performed via a catalog locate or by other means previously described. Once the diagnostic information is recovered, the system may use the information to perform troubleshooting operations to determine, for example, root cause of the error/error message (step 294). The system is able to quickly find and access the data set-specific diagnostic information relating to the base data set causing the error without having to search through a variety of locations. The method 270 then ends (step 296).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for retaining diagnostic information for data in a computing storage environment by a processor device, comprising:
    initializing a diagnostic component, apart from a volume table of contents (VTOC), that is associated with an integrated catalog facility (ICF) catalog and with a base data set from a plurality of data sets via a catalog association record, wherein the diagnostic component is configured to retain base data set-specific diagnostic information retrievable by the computing storage environment to assist in error diagnosis and the ICF catalog is one of the plurality of data sets storing a plurality of information about the plurality of data sets for facilitating a retrieval of a name of the base data set and assists with retaining and retrieval of the base data set-specific diagnostic information;
    storing the base data set-specific diagnostic information pursuant to at least one event associated with the base data set; and
    detecting the at least one event associated with a data set, wherein the at least one event includes at least one of opening the data set and performing a backup operation for the data set.

2. The method of claim 1, wherein storing the base data set-specific diagnostic information pursuant to the at least one event associated with the base data set includes performing at least one of:
    tracking a number of times the base data set is opened for output,
    logging at least one of a job, system, time of open, time of close, and a high used relative byte address at a time of closure,
    tracking a last backup data set,
    logging at least one of a backup name, backup location, and backup date,
    logging a history of each system that accesses the base data set,
    logging at least one prior error event,
    logging an enqueue (ENQ) operation performed subsequent to an address space failure, and
    logging extent information associated with the base data set.

3. The method of claim 2, wherein logging the at least one prior error event further includes logging at least one error message previously issued against the base data set.

4. The method of claim 3, wherein logging the at least one error message previously issued against the base data set further includes indicating in, by an owning application, that an error event type associated with the at least one prior error event should be logged in the diagnostic component.

5. The method of claim 1, wherein initializing the diagnostic component is performed pursuant to one of creating the base data set and adding the diagnostic component to a pre-existing base data set.

6. The method of claim 1, further including:
    monitoring for one of an error and error messages,
    detecting one of the error and the error message, and
    retrieving the base data set-specific diagnostic information from the base data set determined to have caused the error.

7. The method of claim 1, further including, upon detecting the at least one event associated with the data set, performing each of:
    scanning message text to extract a name of the data set, and
    performing a catalog locate operation, wherein the data set-specific diagnostic information relating to the event is stored in the diagnostic component if a determination is made that the data set has an accompanying diagnostic component.

8. A system for retaining diagnostic information for data in a computing storage environment, comprising:
    a diagnostic component;
    at least one processor device operable in the computing storage environment and in association with the diagnostic component;
    a data set module operational by the at least one processor device in the computing storage environment, wherein the data set module:
        initializes the diagnostic component, apart from a volume table of contents (VTOC), and is associated with an integrated catalog facility (ICF) catalog and a base data set from a plurality of data sets via a catalog association record, wherein the diagnostic component is configured to retain base data set-specific diagnostic information retrievable by the computing storage environment to assist in error diagnosis and the ICF catalog is one of the plurality of data sets storing a plurality of information about the plurality of data sets for facilitating a retrieval of a name of the base data set and assists with retaining and retrieval of the base data set-specific diagnostic information, stores the base data set-specific diagnostic information pursuant to at least one event associated with the base data set, and detects the at least one event associated with a data set, wherein the at least one event includes at least one of opening the data set and performing a backup operation for the data set.

9. The system of claim 8, wherein the data set module, for storing the base data set-specific diagnostic information pursuant to the at least one event associated with the base data set, performs at least one of:

tracking a number of times the base data set is opened for output, logging at least one of a job, system, time of open, time of close, and a high used relative byte address at a time of closure, tracking a last backup data set, logging at least one of a backup name, backup location, and backup date, logging a history of each system that accesses the base data set, logging at least one prior error event, logging an enqueue (ENQ) operation performed subsequent to an address space failure, and logging extent information associated with the base data set.

10. The system of claim 9, wherein the data set module logs at least one error message previously issued against the base data set.

11. The system of claim 8, wherein the diagnostic component is an appendage to the base data set, and the catalog association record is used to direct the base data set-specific diagnostic information to a correct location.

12. The system of claim 11, wherein the at least one prior error event includes at least one error message previously issued against the base data set.

13. The system of claim 12, further including an owning application in communication with the data set module, wherein the owning application indicates in the at least one prior error event that an error event type associated with the at least one prior error event should be logged in the diagnostic component.

14. The system of claim 8, wherein the data set module initializes the diagnostic component pursuant to one of creating the base data set and adding the diagnostic component to a preexisting base data set.

15. The system of claim 8, wherein the at least one processor device performs at least one of:

monitoring for one of an error and error messages, detecting one of the error and the error message, and retrieving the base data set-specific diagnostic information from the base data set determined to have caused the error.

16. The system of claim 8, wherein the at least one processor device, upon detecting the at least one event associated with the data set, performing each of:

scanning message text to extract a name of the data set, and performing a catalog locate operation, wherein the data set-specific diagnostic information relating to the event is stored in the diagnostic component if a determination is made that the data set has an accompanying diagnostic component.

17. A computer program product for retaining diagnostic information for data using a processor device in a computing storage environment, the computer program product comprising a non-transitory computer-readable storage medium having computer-readable program code portions stored therein, the computer-readable program code portions comprising:

a first executable portion that initializes a diagnostic component, apart from a volume table of contents (VTOC), that is associated with an integrated catalog facility (ICF) catalog and with a base data set from a plurality of data sets via a catalog association record, wherein the diagnostic component is configured to retain base data set-specific diagnostic information retrievable by the computing storage environment to assist in error diagnosis and the ICF catalog is one of the plurality of data sets storing a plurality of information about the plurality of data sets for facilitating a retrieval of a name of the base data set and assists with retaining and retrieval of the base data set-specific diagnostic information;

a second executable portion that stores the base data set-specific diagnostic information pursuant to at least one event associated with the base data set; and a third executable portion that detects the at least one event associated with a data set, wherein the at least one event includes at least one of opening the data set and performing backup operation for the data set.

18. The computer program product of claim 17, wherein storing the base data set-specific diagnostic information pursuant to the at least one event associated with the base data set further includes a fourth executable portion that performs at least one of:

tracking a number of times the base data set is opened for output, logging at least one of a job, system, time of open, time of close, and a high used relative byte address at a time of closure, tracking a last backup data set, logging at least one of a backup name, backup location, and backup date, logging a history of each system that accesses the base data set, logging at least one prior error event, logging an enqueue (ENQ) operation performed subsequent to an address space failure, and logging extent information associated with the base data set.

19. The computer program product of claim 18, wherein logging the at least one prior error event further includes a fifth executable portion that logs at least one error message previously issued against the base data set.

20. The computer program product of claim 19, wherein logging the at least one error message previously issued against the base data set further includes a sixth executable portion that indicates in, by an owning application, that an error event type associated with the at least one prior error event should be logged in the diagnostic component.

21. The computer program product of claim 17, further including a fourth executable portion that initializes the diagnostic component pursuant to one of creating the base data set and adding the diagnostic component to a preexisting base data set.

22. The computer program product of claim 17, further including a fourth executable portion that performs one of:

monitoring for one of an error and error messages,
detecting one of the error and the error message, and
retrieving the base data set-specific diagnostic information from the base data set determined to have caused the error.

23. The computer program product of claim 17, further including a fourth executable portion that, upon detecting the at least one event associated with the data set, performs each of:
scanning message text to extract a name of the data set, and
performing a catalog locate operation, wherein the data set-specific diagnostic information relating to the event is stored in the diagnostic component if a determination is made that the data set has an accompanying diagnostic component.

* * * * *